US010324766B1

(12) United States Patent
Karp et al.

(10) Patent No.: US 10,324,766 B1
(45) Date of Patent: Jun. 18, 2019

(54) TASK PROFILE COLLECTION

(71) Applicant: Amazon Technologies, Inc., Seattle, WA (US)

(72) Inventors: Samuel Benjamin Karp, Seattle, WA (US); Euan Skyler Kemp, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 15/080,484

(22) Filed: Mar. 24, 2016

(51) Int. Cl.
*G06F 9/50* (2006.01)
*G06Q 10/06* (2012.01)

(52) U.S. Cl.
CPC ... *G06F 9/5083* (2013.01); *G06Q 10/063118* (2013.01)

(58) Field of Classification Search
CPC .................................................. G06F 9/5083
See application file for complete search history.

(56) References Cited

U.S. PATENT DOCUMENTS 9,256,467 B1 * 2/2016 Singh .................... G06F 9/5055

OTHER PUBLICATIONS

"Amazon ECS Task Definitions," Amazon Web Services, Inc. © 2016, <http://docs.aws.amazon.com/AmazonECS/latest/developerguide/task_defintions.html> [retrieved Mar. 23, 2016], 2 pages.
"What Is a Docker?," Docket © 2016, <https://www.docker.com/what-docker> [retrieved Mar. 23, 2016], 10 pages.

* cited by examiner

*Primary Examiner* — Sisley N Kim
(74) *Attorney, Agent, or Firm* — Davis Wright Tremaine LLP

(57) ABSTRACT

The present document describes systems and methods for collecting and distributing information associated with distributed tasks. The information is collected using task definition templates which are provided to a computing resource management service. The task definition templates include substitution elements that act as placeholders for desired information. The values associated with the substitution elements are collected by the computing resource management service, and by agents that maintain access to the task computing environment. Various substitution elements are populated when an associated task is scheduled, assigned to a computing resource, started, completed, or removed from the system. The information is made available via an application programming interface, thereby enabling coordination between tasks as well as overall application management.

18 Claims, 10 Drawing Sheets

Example Task Definition Template

```
"taskDefinition": {
  "containerDefinitions": [ {
      "environment": [ {
          "name": "CLUSTER",
702 ⸺    "value": "${crs.cluster}" },
        {
          "name": "PORT",
704 ⸺    "value": "${crs.containers.mycontainer.hostports.53/udp}" }
      ],
      "essential": true,
      "image": "myimage",
      "logConfiguration": {
        "logDriver": "fluentd",
        "options":
          {
            "tag" :
706 ⸺        "${crs.taskdef.family}:${crs.taskdef.revision}-${crs.instance.id}" }
      },
      "mountPoints": [
        {
          "containerPath": "/data/mine",
          "sourceVolume": "task-volume"
        }
      ],
      "name": "mycontainer",
      "portMappings": [
        {
          "containerPort": 53,
          "protocol": "udp" }
      ]
    }
  ],
  "family": "mytaskdefinition",
  "volumes": [
    {
      "host": {
         "sourcePath": "/data/${crs.task.id}" },
708 ⸺  "name": "task-volume"
    }
  ],
  "enableElementInsertion": true }
```

The template includes substitution fields which are identified with a '$'

The template includes substitution fields which are identified with a '$'

FIG. 7

Example Fully-Rendered Task
Definition Template

900

```
"taskDefinition": {
  "containerDefinitions": [ {
    "environment": [ {
        "name": "CLUSTER",
902 ─      "value": "mycluster" },
        {
        "name": "PORT",
904 ─      "value": "71345" }
    ],
    "essential": true,
    "image": "myimage",
    "logConfiguration": {
      "logDriver": "fluentd",
      "options":
        {
          "tag" :
906 ─        "mytaskdefinition:5-i-abcdg123" }
    },
    "mountPoints": [
      {
        "containerPath": "/data/mine",
        "sourceVolume": "task-volume"
      }
    ],
    "name": "mycontainer",
    "portMappings": [
      {
        "containerPort": 53,
        "protocol": "udp" }
    ]
  }
  ],
  "family": "mytaskdefinition",
  "volumes": [
    {
      "host": {
        "sourcePath": "/data/abcdefg" },
908 ─    "name": "task-volume"
    }
  ],
  "enableElementInsertion": true }
```

The remaining substitution field is populated after the task starts, when the value becomes available to the agent. (arrow points to 904)

FIG. 9

TASK PROFILE COLLECTION

BACKGROUND

Computing resource service providers have provided computing resources in a number of different ways. Early computing resources such as large mainframe computers were made available to customers through computer time-sharing services. Over time, the cost of computers declined, and renting dedicated physical computer servers became more common. Customer demands for increased resource flexibility led to the development of virtual computing environments and application hosting environments that decoupled the computing environment provided to the customer from the physical computers of the service provider.

Customers are now able to deploy large distributed applications within environments that include multiple physical and/or virtual computing resources. Some customers use containers to provide an isolated execution environment for each customer task. Containers enable flexibility in the deployment of customer applications, as well as control over the computing resources allocated to each customer task. However, since the various customer tasks are isolated from each other, it can be difficult to coordinate across different customer tasks. Since a large distributed application may include dozens or hundreds of containers that work together to form a distributed system, enabling the coordination of containerized customer applications is an important problem.

BRIEF DESCRIPTION OF THE DRAWINGS

Various techniques will be described with reference to the drawings, in which:

FIG. 7 shows an illustrative example of a task definition template with unresolved substitution elements;

FIG. 9 shows an illustrative example of a fully resolved task definition template with resolved substitution elements.

DETAILED DESCRIPTION

Figure 1:
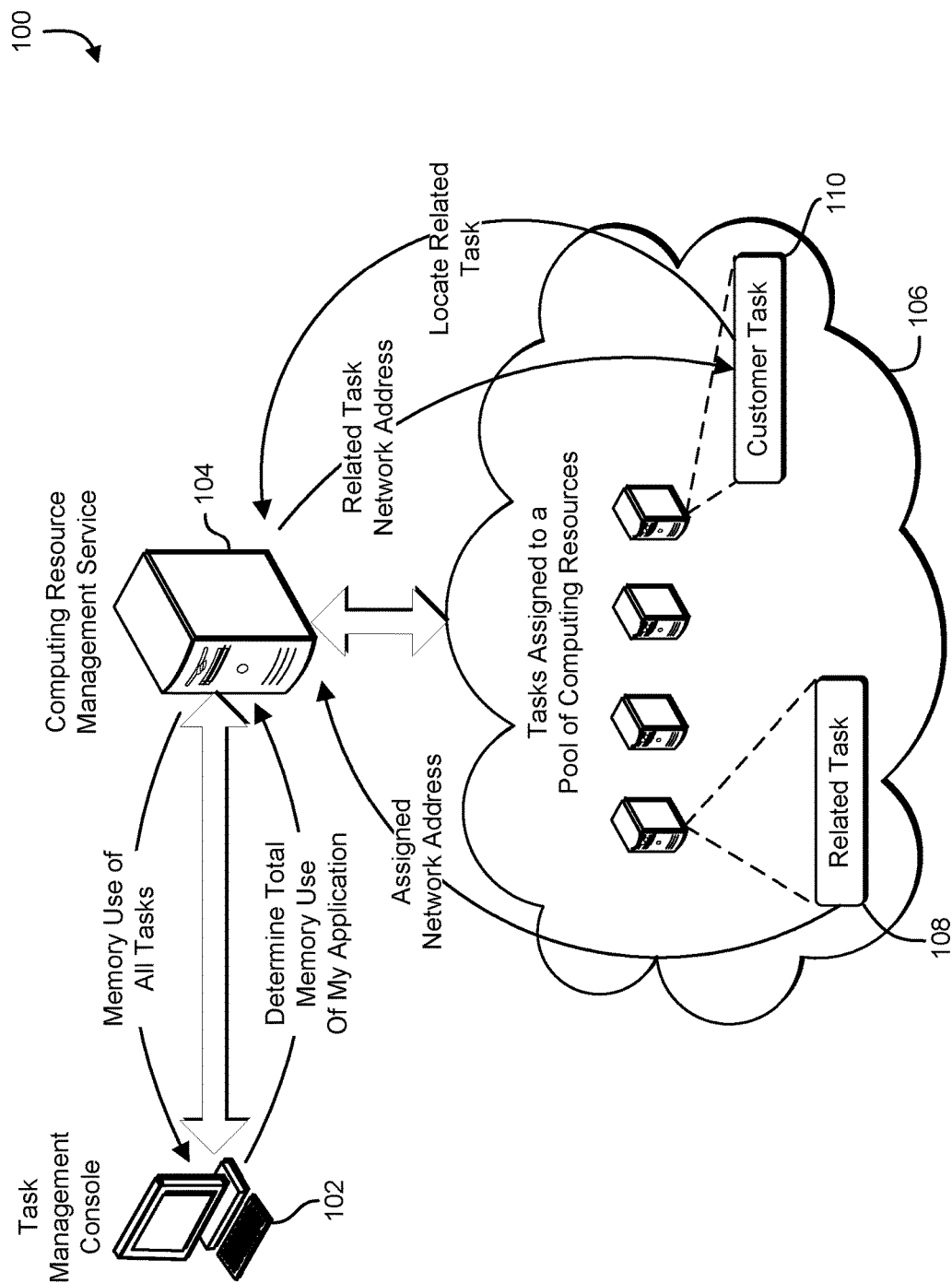
FIG. 1 shows an illustrative example of an environment in which various embodiments may be practiced.

The current document describes systems and methods for collecting and distributing information associated with customer tasks in a distributed computing environment. Task definition templates are provided to a computing resource management service that monitors the operation of customer tasks. Each task definition template includes one or more substitution elements. Each substitution element identifies a particular value associated with the task. The values associated with each substitution element are ascertainable at different times during the life of an associated task. For example, values may be ascertained when the associated task is scheduled, assigned to a computing resource, started, completed, or removed from the system. The values ascertained can include a task name, a task revision, a task identifier, a component identifier, a host identifier, host information (such as IP address, hostname, etc.), or a dynamic network port assignment.

Values that are ascertainable during the scheduling or assignment of the task are evaluated by components of the computing resource management service. When the computing resource management service ascertains values for a particular task, substitution elements within a corresponding task definition template are populated with the ascertained values. In some implementations, the computing resource management service is a resource scheduler that assigns tasks to a collection of computer systems in a data center. In another implementation, the computing resource management service is a hypervisor that manages a collection of virtual machines. In yet another implementation, the computing resource management service is a container management service that monitors containerized tasks of a distributed application running on physical or virtual computing resources. The computing resource management service may examine and populate various substitution elements as a result of events related to a task such as starting a task, receiving status from a task, assigning a task to a particular computing resource managed by the computing resource management service, or scheduling a task for execution.

Values that are ascertainable after the task has started are evaluated by an agent that is able to access the computing environment to which the task is assigned. In some implementations, the agent is provided with the partially-populated task definition template, and populates additional substitution elements with values that are ascertainable by the agent after the task is started. The populated template may be returned to the computing resource management service and stored in a database of task information. In another implementation, the agent ascertains values associated with tasks that are accessible to the agent, and transmits the values to the computing resource management service. The computing resource management service populates the task definition template, and retains the populated task definition template in a task information database. The agent may be a process running within a hypervisor, a container service, or within the process space of the task itself. A single agent may be employed to monitor and evaluate values for a plurality of tasks. For example, an agent running within a container service on a virtual computer system may monitor a plurality of containerized tasks deployed on the virtual computer system. In another example, an agent running within a hypervisor may monitor a plurality of tasks running within virtual machines provided by the hypervisor. In yet another example, an agent deployed on a computer system may monitor a plurality of processes running on the computer system.

The populated task definitions are used by the computing resource management service to provide task information via an application programming interface ("API"). The API can be accessed by client computer systems on external networks as well as by tasks monitored by the computing resource management service. Client computer systems can use the API to implement a monitoring application for a distributed application. For example, the monitoring application can retrieve deployment and status information for all tasks in the distributed application, even when the tasks are run on a wide variety of computing resources. Individual tasks that are part of a distributed application can use the API to discover other tasks with which they need to communicate or interact. Communication parameters and task registration information can be published and shared across the distributed application.

In some examples, task information is collected after a task ends. If a task ends normally, task results and status information are collected by the agent and may be populated into the task definition template if corresponding substitution elements are present. If a task ends abnormally, such as during a hardware or software failure, a debug flag within the task definition template may be used to select an amount of debug information to be captured. Debug information may include error codes, task execution logs, debug logs, memory dumps, and other information. In some implementations, the task definition template may indicate that the task not be removed from the computing resource. Instead, in order to enable debugging, the agent signals to an administrator that the task has crashed, and identifies the computing resource to which the craft task is assigned.

The information collected and made available from the populated task definitions may be used to solve a variety of customer problems. In one example, a customer may tag log files with a task ID which is generated when the task is scheduled. In another example, a customer queries the information from within a task to identify dynamically-chosen host ports which are assigned to the task at run time. The information is used to register the task with a service discovery system. In yet another example, a customer queries the task definition profiles to discover other instances of similar tasks. In yet another example, a customer exchanges information between tasks to generate identifiers which are unique across to the tasks. In yet another example, the customer may supply run-time information about a task, such as an assigned IP address or hostname, when launching subordinate tasks. A task can ascertain information about the environment in which it runs, and may adjust its operation based on characteristics of the environment.

FIG. 1 shows an illustrative example of an environment in which various embodiments may be practiced. An environment 100 includes a customer computer system that is configured to operate as a task management console 102. The task management console 102 is connected to a computing resource management service 104 via an external network such as the Internet. The computing resource management service 104 monitors a collection of computing resources 106 which are provided to the customer for the purpose of hosting a distributed application. The distributed application is comprised of a plurality of customer tasks which run on various resources in the collection of computing resources 106. A customer task 108 and a related task 110 are tasks that belong to the distributed application.

Both the customer task 108 and the related task 110 are scheduled, deployed to particular computing resources in the collection of computing resources 106, and started by the computing resource management service 104. In some examples, the computing resource management service 104 is a container management service, and the individual computing resources in the collection of computing resources 106 are physical or virtual computer systems running a container service such as Docker. In another example, the computing resource management service 104 is a virtual computing service provider, and the individual computing resources in the collection of computing resources 106 or virtual machines created and managed by the virtual computing service provider.

The customer provides a task definition template for both the customer task 108 and the related task 110. The computing resource management service 104 retains the task definition templates, and as the tasks are scheduled, deployed, and started, the computing resource management service 104 scans the corresponding task definition template and ascertains available values for substitution elements that are present in the corresponding task definition template. The substitution elements for which values are available are populated, and the populated task definition is retained by the computing resource management service 104. When the customer task 108 and the related task 110 are started, the corresponding populated task definition templates are provided to an agent running on the computing resource which hosts the corresponding task. After the tasks started, the agent determines task values which are available, and populates the corresponding substitution elements in the populated task definition. The updated populated task definition is returned to the computing resource management service 104. The computing resource management service 104 acquires information about the customer task 108 and the related task 110.

The computing resource management service 104 provides an application programming interface ("API") for accessing and analyzing information collected in the task definitions. In some examples, the API is accessible by various tasks of the distributed application. The customer task 108 can use the API to obtain information about the related task 110. For example, in FIG. 1, the related task 110 is assigned a network address on startup. An agent running on the same computing resource as the related task 110, ascertains the assigned network address, and transmits the information to the computing resource management service 104. The customer task 108 can send a query to the API and discover other tasks associated with the distributed application such as the related task 110. The customer task 108 may request information about the related task 110 via the API on the computing resource management service 104. The computing resource management service 104 returns, to the customer task 108, the requested information such as the related task's network address.

In another example, the API is accessible to customer systems outside the collection of computing resources 106. The task management console 102 calls into the API and is able to inquire as to the state of the distributed application. For example, using the task management console 102, the customer can enumerate the tasks associated with the distributed application. The customer can determine which tasks are running, the resources used by each task, and view the overall performance of the application. In the example shown in FIG. 1, the task management console 102 sends a request to the computing resource management service 104 via the API. The request asks for application-wide resource information such as the total memory used by all tasks in the distributed application. The computing resource management service 104 examines the information in the task definitions, and provides the information to the task management console 102.

Figure 2:
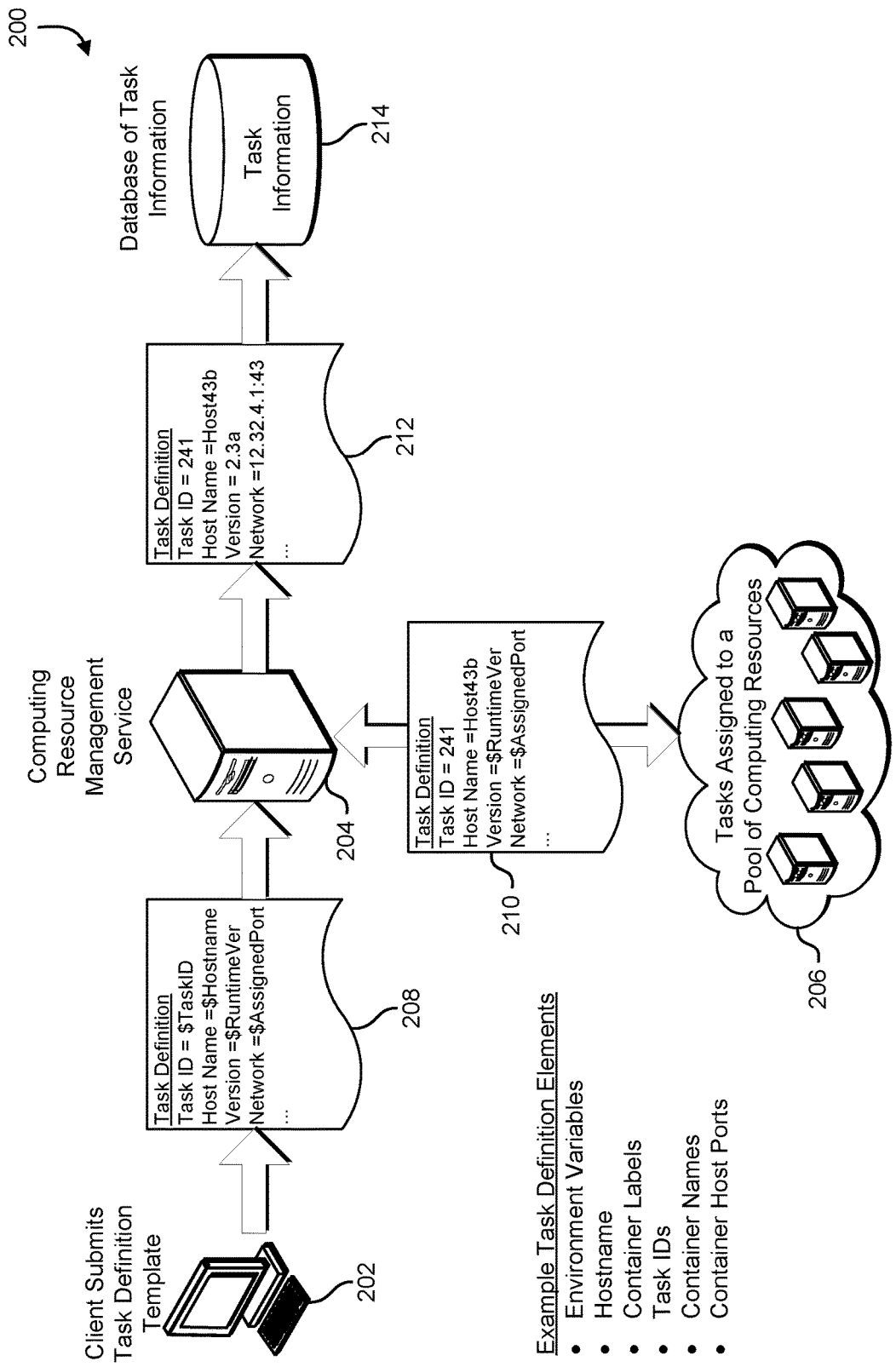
FIG. 2 shows an illustrative example of a system that populates task definition templates provided by a client, in order to produce task definition profiles which are maintained in a task information database.

FIG. 2 shows an illustrative example of a system that populates task definition templates provided by a client, in order to produce task definition profiles which are maintained in a task information database. System 200 includes a client 202 operated by customer, and a computing resource management service 204 operated by a computing resource provider. The computing resource provider provides a pool of computing resources 206. The pool of computing resources may include physical computer systems, servers, and virtual machines. In some implementations the pool of computing resources 206 includes physical or virtual servers that provide container services.

The client 202 submits an unpopulated task definition template 208 to the computing resource management service 204. The unpopulated task definition template 208 includes substitution elements. Substitution elements that may be identified in a variety of ways such as escape characters or other tags. Each substitution element contains information that identifies a value associated with the task. The computing resource management service 204 schedules the task, assigns the task to computing resources in the pool of computing resources 206, and starts the task. As each operation on the tasks is performed, the computing resource management service 204 examines the unpopulated task definition template 208 and identifies substitution elements for which values are available. If the value is available for a particular substitution element, the computing resource management service 204 retrieves the value, and populates the associated substitution element in the unpopulated task definition template 208. As a result, the unpopulated task definition template 208 may be partially or fully populated with values resulting in a partially populated task definition template 210.

Once the task is started, the computing resource management service 204 transmits the partially populated task definition template 210 to an agent running on the computing resource on which the task has been deployed. The agent monitors the operation of the task, and identifies available values for substitution elements remaining in the partially populated task definition template 210. Examples of values that become available after the task is started include network addresses and ports that are assigned at runtime, process IDs, and container host ports. The agent returns the modified partially populated task definition template 210 to the computing resource management service 204. The computing resource management service 204 stores a rendered task definition 212 in a task information database 214. The rendered task definition 212 may be fully rendered and may no longer include substitution elements. In some implementations, the substitution elements are retained in the rendered task definition 212, and updated values are populated by the computing resource management service 204 and the agent.

If the computing resource management service 204 receives a request for task information, the computing resource management service queries the task information database 214, and retrieves the most recent versions of the rendered task definitions. The information in the rendered task definition is used to generate a response to the request.

Figure 3:
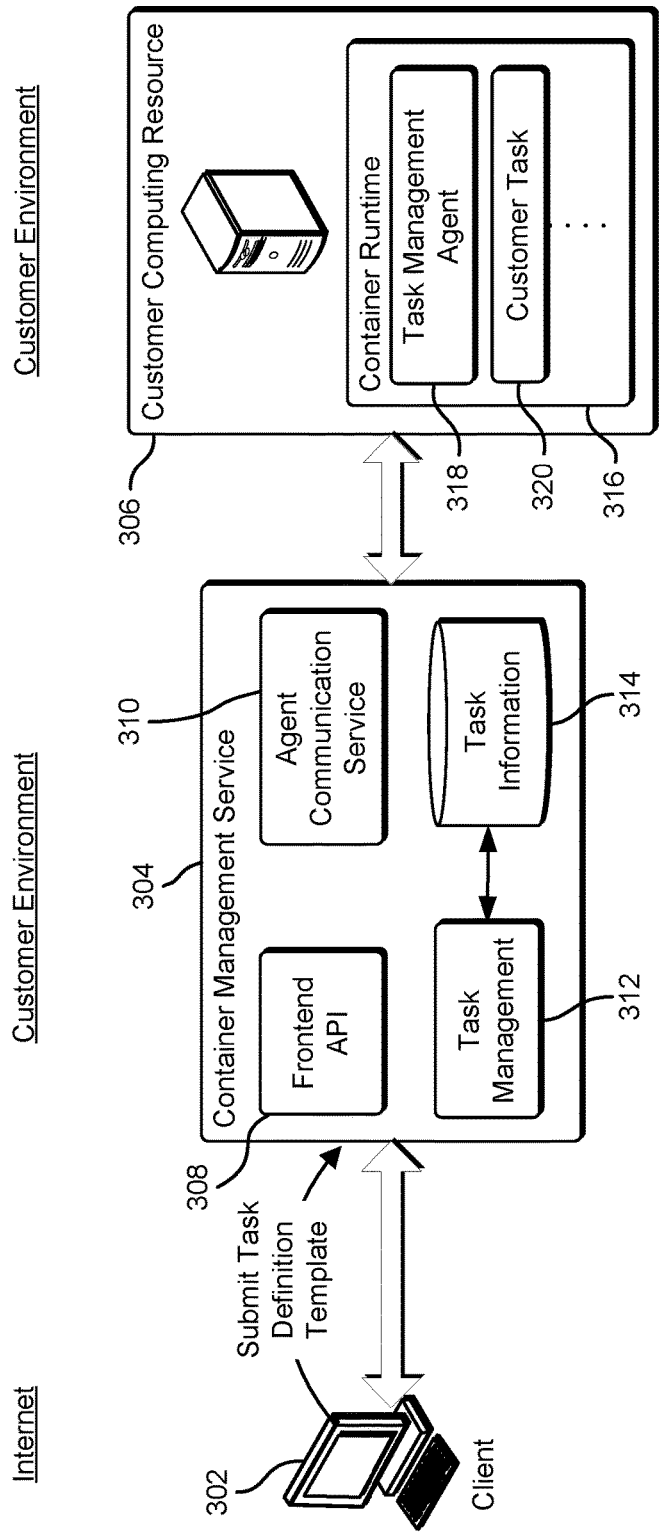
FIG. 3 shows an illustrative example of a container management service that coordinates the collection of task metadata with a number of task management agents.

FIG. 3 shows an illustrative example of a container management service that coordinates the collection of task metadata with a number of task management agents. An environment 300 includes a client computer system 302, a container management service 304, and a customer computing resource 306. The client computer system 302 is operated by the customer, and may be used to interact with an application programming interface provided by the container management service 304, or to submit task definition templates. The client computer system 302 may submit task definition templates that are adapted to the needs of particular customer tasks or adapted to collect information needed to monitor and control a distributed application. In some examples, the client computer system 302 may submit a plurality of task definition templates for a single task.

The container management service 304 includes a frontend API component 308, an agent communication service 310, a task management module 312, and a task information database 314. The container management service 304 is a service hosted by a computer system maintained by a computing resource service provider. The computing resource service provider provides computing resources to customers for hosting customer applications or tasks. The container management service 304 is provided to allow customers to control and coordinate their applications and tasks. The frontend API component 308 implements an application programming interface that is exposed to the customer via a network interface. The application programming interface is accessible to the client computer system 302 and to customer tasks running on the customer computing resource 306. The agent communication service 310 handles interactions with remote agents running on the computing resources provided by the computing resource service provider. The remote agents are used by the container management service 304 to monitor customer tasks after they are deployed and started. The task management module 312 controls the scheduling, assignment, and execution of customer tasks, as well as the collection and retention of information collected from the customer tasks. The task information database 314 is a data store that retains information related to customer tasks and may also retain populated and unpopulated task definitions.

The customer computing resource 306 is a computing resource managed by the computing resource service provider for the purpose of running customer tasks. The customer computing resource 306 operates a container service 316 for hosting customer tasks. A task management agent 318 operates within the container service 316, and is used to collect information from customer tasks and transmit the information to the agent communication service 310. The customer computing resource 306 hosts one or more customer tasks 320. In the environment shown in FIG. 3, each customer task operates in accordance with the requirements of the container service 316. In other implementations, the customer tasks can be applications running in a virtual machine environment, or separate processes.

Figure 4:
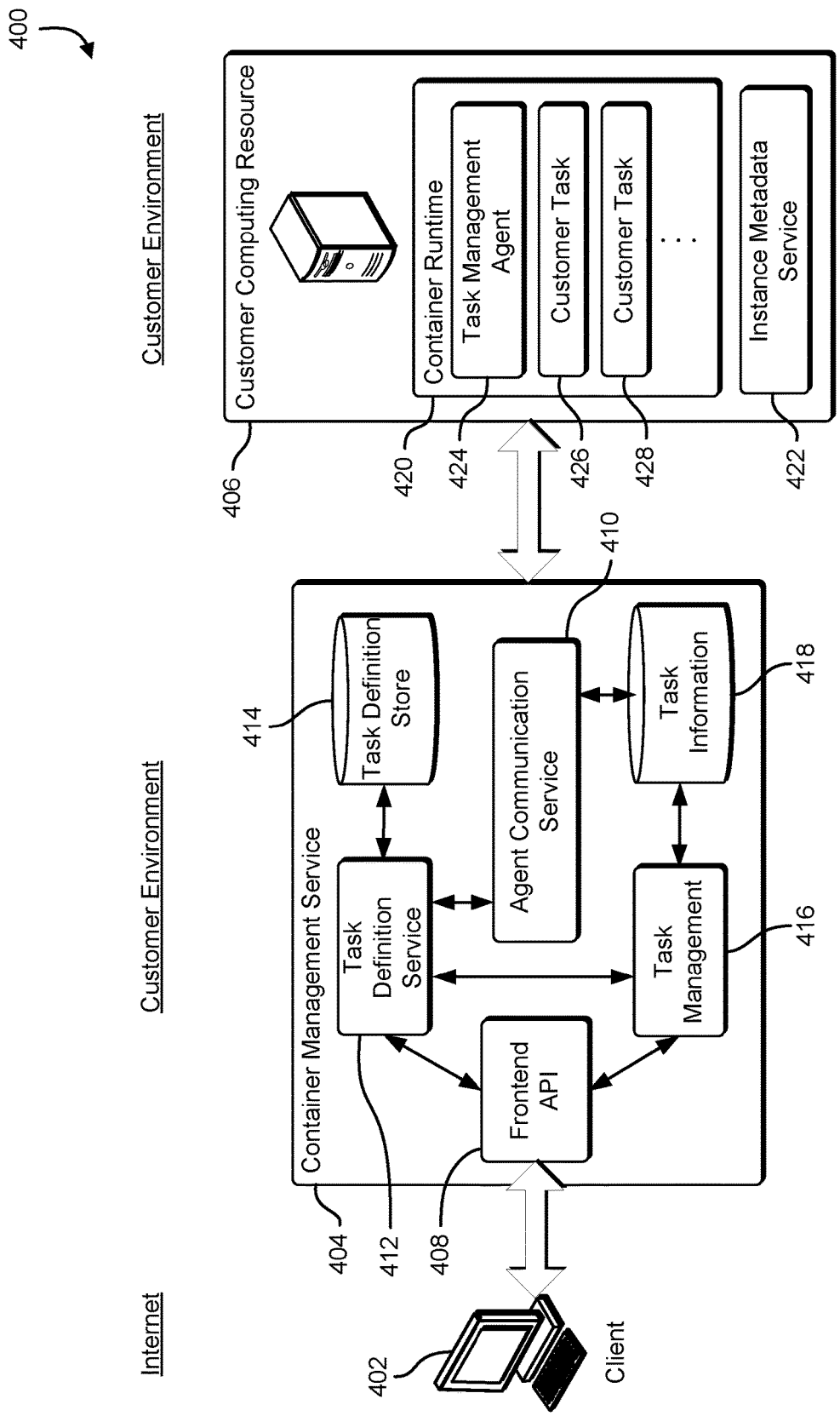
FIG. 4 shows an illustrative example of an architecture for a container management service for collecting and managing task metadata.

FIG. 4 shows an illustrative example of an architecture for a container management service for collecting and managing task metadata. An environment 400 includes a client computer system 402, a container management service 404, and a customer computing resource 406. The client computer system 402 accesses an API provided by the container management service 404. The client computer system 402 may access the container management service 404 over a computer network, or via interprocess communication.

The container management service 404 includes a frontend API 408, an agent communication service 410, a task definition service 412, a task definition store 414, a task management module 416, and a task information database 418. The frontend API 408 implements an application programming interface that is exposed to the client computer system 402 and to other computing systems that host customer tasks. The agent communication service 410 provides communication with task management agents. The task management agents run on customer computing resources and monitor customer tasks that are deployed to the customer computing resources. The task definition service 412 handles task definitions. The task definitions may be unpopulated, partially populated, or fully rendered. The task definition service 412 maintains the most recent version of the task definitions in the task definition store 414. In some implementations, the task definition service 412 maintains past versions of a task definition, enabling the history of task values to be evaluated. In another implementation, the task definition service 412 maintains multiple task definitions for a single customer task. The task management module 416 controls the scheduling, assignment, and execution of customer tasks. In some implementations, the task management module 416 acquires information related to a customer task, and provides the information to the task definition service 412 for population and the corresponding task definition template. Task information may be maintained in the task information database 418. The task information may include task status, resource assignment information, and other information used by the task management module 416.

The customer computing resource 406 hosts a container service 420 and an instance metadata service 422. The container service 420 provides an environment for hosting customer tasks that comply with the requirements of the container service 420. The instance metadata service 422 runs on the customer computing resource 406, and provides, to the task management agent 424, information relating to the computing resource on which customer tasks are hosted. In some implementations the instance metadata service 422 provides information about a virtual machine. In another implementation, the instance metadata service 422 provides information about a physical computing resource such as a server. The customer tasks 426, 428 are container tasks, and are monitored by the task management agent 424. Each task may acquire information about other customer tasks by querying the frontend API 408.

Figure 5:
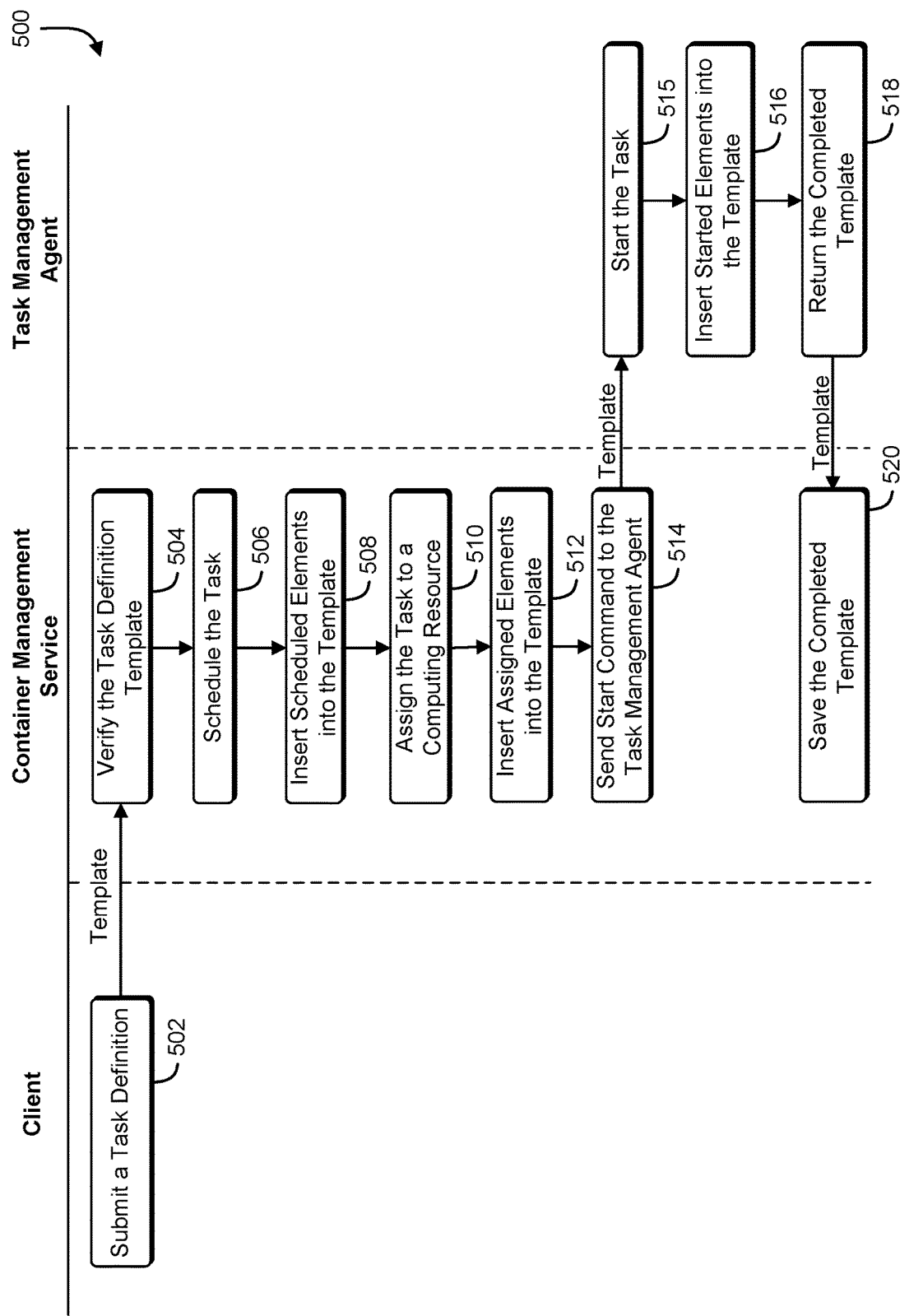
FIG. 5 shows an illustrative example of a process that, when performed by a client, a container management service, and a task management agent, populates a task definition template with metadata related to a task.

FIG. 5 shows an illustrative example of a process that, when performed by a client, a container management service, and a task management agent, populates a task definition template with metadata related to a task. A swim diagram 500 illustrates a process that begins at block 502 with a client submitting a task definition to a container management service. The container management service receives the task definition, and verifies 504 that the task definition template is valid. In various implementations, the task definition template is verified by confirming that substitution elements within the task definition template identify values that are populated by the container management service or the task management agent. The syntax of the task definition template is confirmed to be in accordance with a syntax expected by the container management service.

At block 506, the container management service causes a task associated with the task definition template to be scheduled for deployment and execution. As a result of scheduling the task, various values associated with the task become ascertainable. At block 508, the container management service examines the task definition template, and identifies any values associated with substitution elements of the task definition template that, as a result of scheduling the task, have become ascertainable. In various examples, metadata that describes the scheduling algorithm may become available. In another example, metadata describing the position of the task in the scheduling queue may become available. The identified values are populated into the task definition template. In some implementations, the identified values are added into the task definition template. In another implementation, the identified values replace corresponding substitution elements in the task definition template.

At block 510, the container management service causes the task associated with the task definition template to be assigned to a computing resource. As a result of the assignment, various values associated with the task become ascertainable. In various examples, metadata that describes the resources of the assigned computing resource may become available as a result of the assignment. The metadata may describe available CPU, memory, and storage resources of the assigned computing resource. At block 512, the data management service examines the task definition template, and identifies any values associated with substitution elements of the task definition template that, as a result of assignment, have become ascertainable. The identified values are populated into the task definition template. The container management service sends 514 a start command and the task definition template to the task management agent.

The task management agent receives the task definition (which may be partially populated or complete) and starts 515 the task. After the task is started, the task management agent examines the task definition and identifies substitution elements that are not yet populated. The task management agent examines a particular unpopulated substitution element, and determines based at least in part on the identity of the particular unpopulated substitution element how to acquire an associated value. A substitution element may include a name, type, or other identifier that identifies the particular unpopulated substitution element. The task management agent can be used to identify dynamically assigned ports, internal and external network addresses, and other values ascertained at runtime. For example, if the unpopulated substitution element identifies a dynamically assigned network port, the task management agent queries the etc/services file on the machine to identify the particular port number assigned. In some examples, the task management agent queries, via a network API, socket options associated with a particular socket to determine an associated bound port number. The task management agent examines the partially populated task definition template and populates 516 substitution elements that correspond to the identified values.

In some implementations, the task management agent receives information generated by the task itself via an API exposed by the task management agent. During operation of the task, the task may generate task data, and upload the task data to the task management agent via the API. The task supplies an identifier with an element of task data. If a substitution element corresponding to the identifier is present in the task definition template, the task management agent replaces the substitution element with the task data.

The task management agent returns 518 the completed task definition template to a container management service. At block 520, the container management service receives the completed task definition template, and retains the completed template in a task information database for later use.

Figure 6:
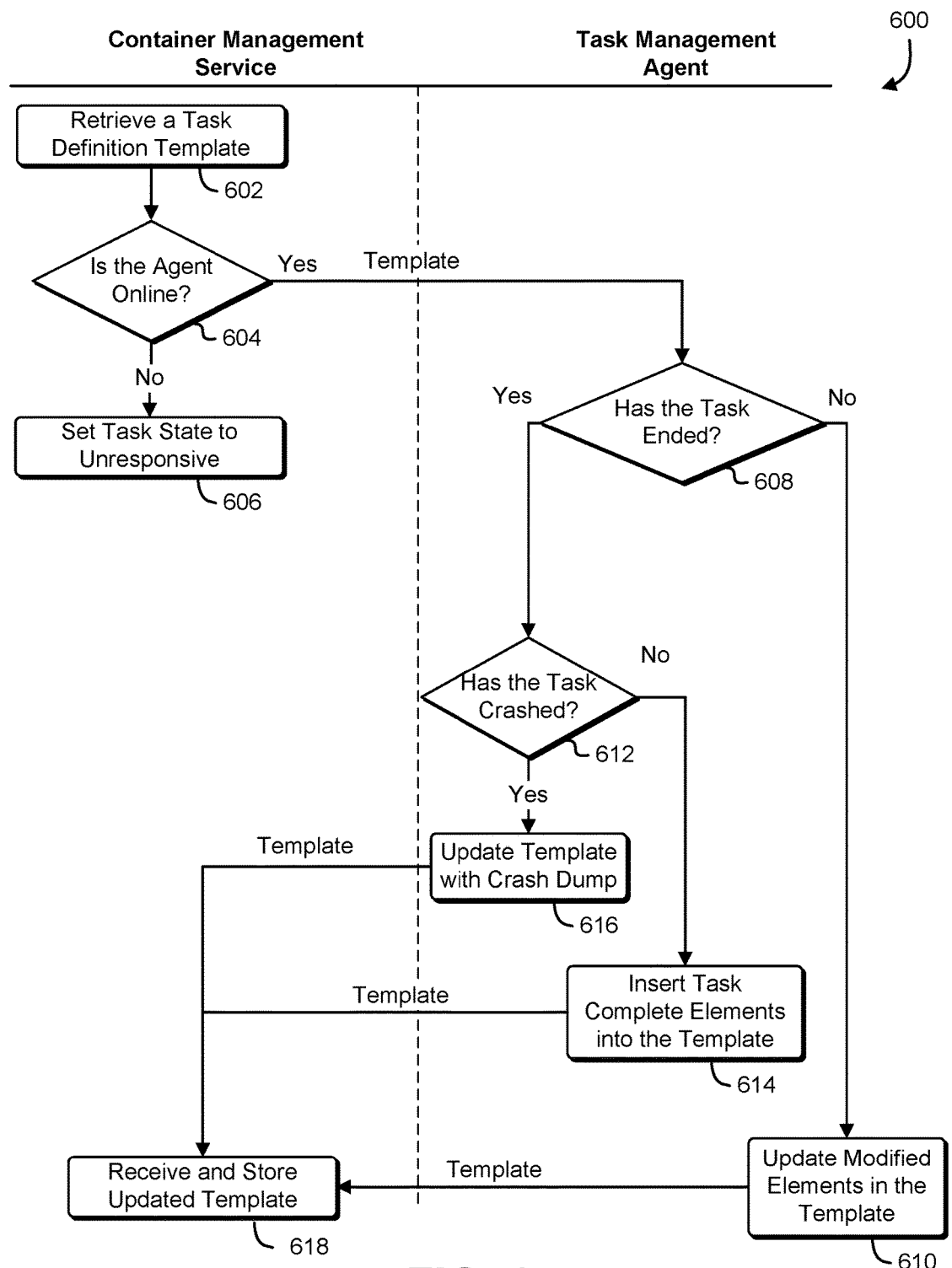
FIG. 6 shows an illustrative example of a process that, when performed by a container management service and a task management agent, updates a task definition template with task metadata which is available after the task has started.

FIG. 6 shows an illustrative example of a process that, when performed by a container management service and a task management agent, updates a task definition template with task metadata, which is available after the task has started. A process diagram 600 shows a process that begins at block 602 with a container management service retrieving a task definition template for a particular customer task. The task definition template may be unpopulated or partially populated, and contains substitution elements that correspond to various values associated with the particular customer task. At decision block 604, the container management service identifies the task management agent which is monitoring the particular customer task, and determines whether the task management agent is in communication with the container management service. The container management service confirms communication with the task management agent by periodically polling an API of the task management agent to retrieve the task's status. If the container management service is unable to contact the task management agent, the container management service determines that the agent is not online, and execution proceeds to block 606 where the container management service records a status associated with the particular customer task as 'unresponsive.' If the task management agent responds to the queries by the container management service, the task management agent is confirmed to be in communication with the container management service, and the container management service provides the task definition template to the task management agent. The task definition template may be provided by passing the content of the task definition template itself to the task management agent in an API call, or by passing a filename or identifier to the task management agent. The task management agent may retrieve the associated task definition template from a database or file system using the provided filename or identifier.

The task management agent examines the particular task associated with the provided task definition template and determines 608 whether the particular task is running, or has ended. If the task management agent determines that the task has not ended, execution proceeds to block 610 and the task management agent acquires values that are assigned at runtime. For example, the task management agent may acquire an internal network address, an external network address, an automatically signed network port, an assigned resource ID, or a cluster ID. The acquired values are used to populate corresponding substitution elements in the provided task definition template, and the updated task definition template is returned to the container management service.

If the task management agent determines that the task has ended, execution proceeds to decision block 612, and the task management agent determines whether the task has crashed or completed successfully. The end status of the task may be determined in a number of ways. In some examples, the task management agent launches the task and receives a status value when the task completes. The status value may indicate an error when the status value is nonzero, and may indicate successful completion when the status value is zero. In another example, a task management agent determines the status value by querying an API provided by the container runtime. If the task is completed successfully, execution proceeds to block 614. At block 614, the task management agent acquires values related to the ending of the particular task such as a task result, an ending status, or an accounting of computing resources used to complete the task. The values related to the ending of the particular task may include a capture of the standard output stream, a return value, or an output file. The standard output stream may be captured by redirecting the standard output stream of the task to a known location at the time the task is started by the task management agent. The acquired values are used to populate corresponding substitution elements in the provided task definition template, and the updated task definition template is returned to the container management service. If the task is not completed successfully, execution proceeds to block 616. At block 616, the task management agent requires values related to the unsuccessful completion of the task such as a memory dump, an error log, or a crash report. The acquired values are used to populate corresponding substitution elements in the provided task definition template, and the updated task definition template is returned to the container management service.

At block 618, the container management service receives the updated task definition template. The updated task definition template is retained in a task information database for later use in responding to requests for task information.

FIG. 7 shows an illustrative example of a task definition template with unresolved substitution elements. An annotated task definition template 700 includes a variety of substitution elements that are able to be populated by the system described above. A first substitution element 702 is populated with the identity of a resource cluster to which the task is assigned. Since the identity of the resource cluster is available at the time the task is assigned, the first substitution element 702 is populated by the container management service.

A second substitution element 704 is populated with the identity of a network port which is dynamically assigned when the task is started. As a result, the value is not accessible to the container management service. An agent running on the computing resource to which the task is assigned receives the task definition template and acquires the identity of the network port after the task is started. The agent populates the second substitution element 704 and returns the populated task definition template to the container management service. In some implementations, the agent does not receive the task definition template, and merely transmits the acquired identity of the network port to the container management service. After receiving the identity of the network port, the container management service populates the second substitution element 704 of the task definition template.

A third substitution element 706 is populated with a number of task-definition values. The task-definition values are populated into the task definition template by the container management service before the task is started. The task-definition values are formatted in accordance with the third substitution element 706. In some implementations, the container management service can perform operations to combine multiple values into a single value. For example, a substitution element may include two values in the form "${ers.costPerCycle} * S{ers.CyclesUsed}." The system ascertains the two values and multiplies them as indicated by the substitution element. The resulting single value is used to populate the task definition template.

A fourth substitution element 708 identifies a task-identifier value. The task-identifier value is populated into the task definition template by the container management service before the task is started.

An example of FIG. 7, substitution elements are identified with a '$' and enclosed in curly brackets. Substitution elements may be identified with other identifying characters or character sequences, both printable and unprintable. In some implementations, different identifying sequences are used to identify a particular actor to perform the population of the substitution element. For example the prefix "$A" may be used to indicate that an agent will populate a particular substitution element, and a prefix"$M" may be used to indicate that a container management service will populate a particular substitution element. In another implementation, substitution elements indicate a task state necessary to populate the element. Different element prefixes may be used to indicate that population of a particular substitution element may occur when the associated task is scheduled, assigned, started, ended, crashed, or removed.

The example substitution elements illustrated in the task definition template of FIG. 7 are not exhaustive. Additional substitution elements may be included such as:

Task ID: ${crs.task.id}
Task definition family: S{crs.taskdef.family}
Task definition revision: ${crs.taskdef.revision}
Container instance ID: ${crs.containerinstance.id}
Container name: S{crs.container.name}
Cluster name: ${crs.cluster.name}
VM instance public IP: S{crs.instance.publicip}1
VM instance private IP: S{crs.instance.privateip}1
VM instance ID: S{crs.ec2instance.id}
region: $ {crs.region}
Account ID: ${crs.account.id}
Container host ports: ${crs.containers.NAME.hostports.1234/tcp}

Figure 8:
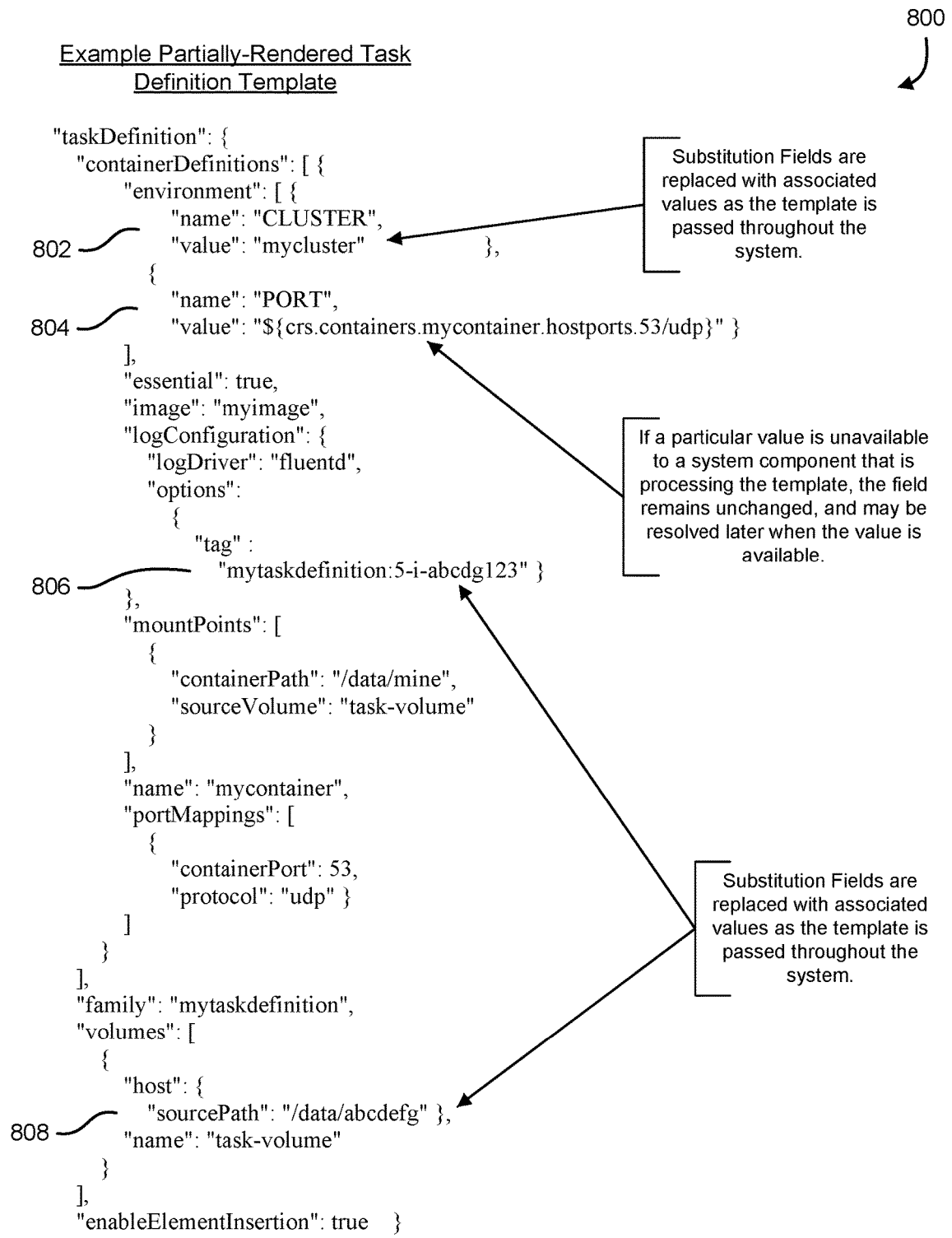
FIG. 8 shows an illustrative example of a task definition template with a mix of resolved and unresolved substitution elements.

Substitution elements may be used to define task parameters such as:
Volume host sourcePath
Entry point
Command
Environment variable value
Hostname
Extra hosts (/etc/hosts file) hostname and IP address
Docker labels
Log options FIG. 8 shows an illustrative example of a task definition template with a mix of resolved and unresolved substitution elements. An annotated partially populated task definition template 800 is an example of a task definition template that may be provided to an agent from the container management service. A first substitution element 802, a third substitution element 806, and a fourth substitution element 808, have been processed by the container management service, and values corresponding to the substitution elements have replaced the escape sequences that identify the values to be substituted.

A second substitution element 804 remains unpopulated. The second substitution element 804 retains the escape sequence that identifies the value to be populated. When the partially populated task definition template 800 is provided to an agent, the agent examines the partially populated task definition template, and identifies the second substitution element 804 as an unpopulated substitution element that remains to be populated. If the value associated with the unpopulated substitution element becomes available to the agent, the agent acquires the value, and performs the substitution, resulting in a fully rendered task definition template such as the example in FIG. 9. The fully rendered task definition template is provided to the container management service via an agent communication service. The container management service retains the fully rendered template in a task information database.

FIG. 9 shows an illustrative example of a fully resolved task definition template with resolved substitution elements. A first substitution element 902, a second substitution element 904, a third substitution element 906, and a fourth substitution element 908 are populated with values corresponding to the substitution elements shown in FIG. 7. The fully resolved task definition template is returned by the agent to the container management service via the agent communication service. The container management service retains the fully resolved task definition template in the task information database so that later requests for information relating to the task can be fulfilled.

Figure 10:
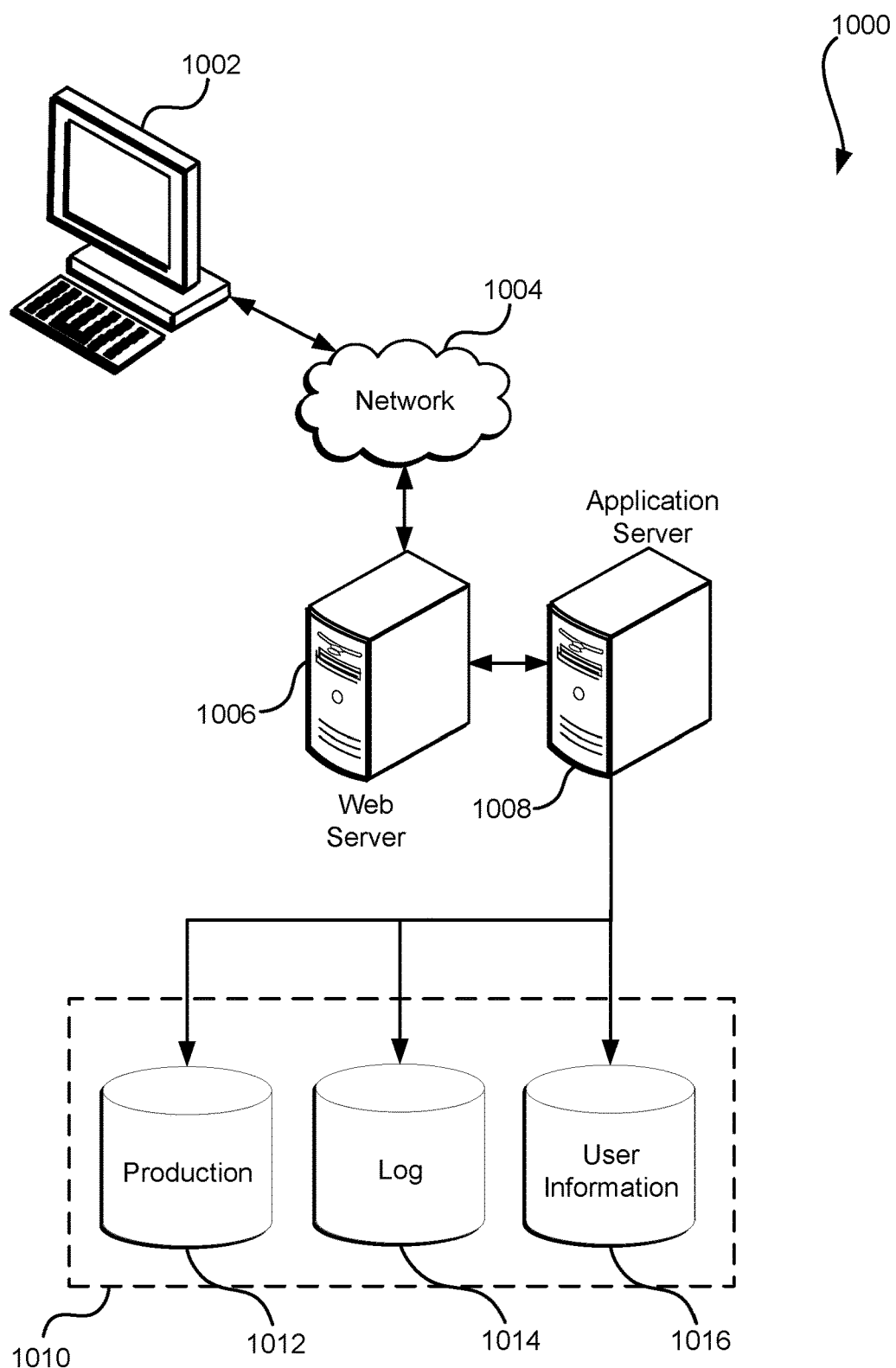
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    under the control of one or more computer systems configured with executable instructions,
        receiving, from a customer computer system, a task definition template, the task definition template associated with a customer task, the task definition template including a first substitution element that identifies a first value associated with the customer task, and the task definition template including a second substitution element that identifies a second value associated with the customer task;
        determining that the first value is ascertainable by the one or more computer systems based at least in part on the state of the customer task;
        acquiring the first value;
        modifying the task definition template by at least in part replacing the first substitution element with the first value to produce an intermediate task definition template;
        causing the customer task to be deployed and executed on a computing resource;
        sending, to an agent running on the computing resource, the intermediate task definition template; and
        receiving, from the agent, a modified task definition template, the modified task definition template based at least in part on the intermediate task definition template, the modified task definition template having the second substitution element replaced with the second value.

2. The computer-implemented method of claim 1, wherein determining that the first value is ascertainable by the one or more computer systems is accomplished at least in part by determining that the customer task is assigned to the computing resource.

3. The computer-implemented method of claim 1, wherein determining that the first value is ascertainable by one or more computer systems is accomplished at least in part by determining that the customer task is scheduled for deployment.

4. The computer-implemented method of claim 1, wherein:
    the second value is ascertainable as a result of the customer task being run on the computing resource; and
    the second value is not ascertainable by the one or more computer systems.

5. A system, comprising at least one computing device configured to implement one or more services, wherein the one or more services are configured to:
    receive a task definition template associated with a customer task;
    acquire a value associated with the customer task;
    populate the task definition template with the value associated with the customer task;
    deploy the customer task to a container on a virtual machine; and
    update the task definition template based at least in part on a network address that is dynamically assigned after the customer task is started and that is not accessible to the one or more services.

6. The system of claim 5, wherein the one or more services are further configured to:
    receive, from an agent capable of monitoring the container, a value that is not accessible to the one or more services; and
    update the task definition template based at least in part on the value that is not accessible to the one or more services.

7. The system of claim 5, wherein the one or more services are further configured to provide an application programming interface, the application programming interface making information based at least in part on the task definition template accessible to clients of the application programming interface.

8. The system of claim 7, wherein:
the application programming interface is available via a computer network; and
the clients of the application programming interface include the customer task.

9. The system of claim 6, wherein:
the task definition template is associated with an additional customer task; and
the one or more services are further configured to:
acquire a value associated with the additional customer task;
populate the task definition template with the value associated with the additional customer task;
deploy the additional customer task to an additional container, the additional container isolated from the container;
receive, from an additional agent capable of monitoring the additional container, an additional value that is not accessible to the one or more services; and
update the task definition template based at least in part on the additional value that is not accessible to the one or more services.

10. The system of claim 6, wherein the value that is not accessible to the one or more services is a value that is established after the customer task is running in the container.

11. The system of claim 6, wherein the one or more services are further configured to:
receive, from the agent, task results generated as a result of the customer task completing; and
update the task definition template based at least in part on the task results.

12. The system of claim 6, wherein the one or more services acquires the value as a result of determining that the customer task is scheduled, assigned, started, or completed.

13. A non-transitory computer-readable storage medium having stored thereon executable instructions that, as a result of being executed by one or more processors of a computer system, cause the computer system to at least:
receive a task definition template for a customer task;
determine an operational state of the customer task;
select a value to be ascertained based at least in part on the operational state of the customer task, and based at least in part on the task definition template;
ascertain the value, the value being ascertainable as a result of the operational state of the customer task;
provide the task definition template to an agent running in a container; and
modify the task definition template based at least in part on the value and based at least in part on receiving a modified task definition template from the agent.

14. The non-transitory computer-readable storage medium of claim 13, wherein the instructions further comprise instructions that, as a result of being executed by the one or more processors, cause the computer system to:
cause the customer task to be executed within a container;
receive, from an agent running in the container, information associated with the customer task; and
modify the task definition template based at least in part on the information.

15. The non-transitory computer-readable storage medium of claim 14, wherein the container is supported by a container runtime which is hosted by a virtual machine instance.

16. The non-transitory computer-readable storage medium of claim 13, wherein:
the task definition template includes a substitution element;
the substitution element specifies the operational state of the customer task; and
the value to be ascertained is selected based at least in part on information contained in the substitution element.

17. The non-transitory computer-readable storage medium of claim 13, wherein the operational state of the customer task is scheduled, assigned, started, ended, crashed, or removed.

18. The non-transitory computer-readable storage medium of claim 13, wherein the instructions further include instructions that cause the computer system to:
retain the task definition template and a task information database;
make additional changes to the task definition template to produce an updated task definition template; and
retain the updated task definition template in the task information database.

* * * * *